(12) United States Patent
Liu et al.

(10) Patent No.: US 8,195,038 B2
(45) Date of Patent: Jun. 5, 2012

(54) BRIEF AND HIGH-INTEREST VIDEO SUMMARY GENERATION

(75) Inventors: Zhu Liu, Middletown, NJ (US); Andrea Basso, Marlboro, NJ (US); David Crawford Gibbon, Lincroft, NJ (US); Behzad Shahraray, Holmdel, NJ (US); Eric Martin Zavesky, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 835 days.

(21) Appl. No.: 12/290,033

(22) Filed: Oct. 24, 2008

(65) Prior Publication Data

US 2010/0104261 A1    Apr. 29, 2010

(51) Int. Cl.
    *H04N 5/783* (2006.01)
(52) U.S. Cl. ........................ 386/344; 715/723
(58) Field of Classification Search .............. 386/278, 386/282, 343, 344, 350, 351; 715/719, 723, 715/730
    See application file for complete search history.

(56) References Cited

U.S. PATENT DOCUMENTS

| | | | | |
|---|---|---|---|---|
| 6,710,822 | B1 * | 3/2004 | Walker et al. | 348/722 |
| 2008/0232687 | A1 * | 9/2008 | Petersohn | 382/173 |
| 2009/0080853 | A1 * | 3/2009 | Chen et al. | 386/52 |

OTHER PUBLICATIONS

Ma et al, "Video Snapshot: A Bird View of Video Sequence", Proceedings of the 11th International Multimedia Conference (MMM'05), 2005.*
Petersohn, "Sub-Shots-Basic Units of Video", Tehnical University of Berlin, pp. 323-326, date unknown.*
Lee et al. "A Fast Clustering Algorithm for Video Abstraction", 2003, pp. 563-568.*
Chen, F., et al., "Video Summarization Preserving Dynamic Content", TRECVID Video Summarization Workshop ACM Multimedia, 2007.
Itti, L., et al., "A Model of Saliency-Based Visual Attention for Rapid Scene Analysis", IEEE Transactions on Pattern Analysis and Machine Intelligence, 1998.
Liu, Z., et al., "AT&T Research at TRECVID 2007", TRECVID 2007 Workshop, 2007.
Liu, Z., et al., "A Fast, Comprehensive Shot Boundray Determination System", IEEE International Conference on Multimedia and Expo, 2007.

* cited by examiner

*Primary Examiner* — David Harvey

(57) ABSTRACT

A video is summarized by determining if a video contains one or more junk frames, modifying one or more boundaries of shots of the video based at least in part on the determination of if the video contains one or more junk frames, sampling a plurality of the shots of the video into a plurality of subshots, clustering the plurality of subshots with a multiple step k-means clustering, and creating a video summary based at least in part on the clustered plurality of subshots. The video is segmented into a plurality of shots and a keyframe from each of the plurality of shots is extracted. A video summary is created based on a determined importance of the subshots in a clustered plurality of subshots and a time budget. The created video summary is rendered by displaying playback rate information for the rendered video summary, displaying a currently playing subshot marker with the rendered video summary, and displaying an indication of similar content in the rendered video summary.

18 Claims, 6 Drawing Sheets

BRIEF AND HIGH-INTEREST VIDEO SUMMARY GENERATION

BACKGROUND OF THE INVENTION

The present invention relates generally to video summarization and more particularly to relevancy in video summarization.

Video summarization may be used to present the main theme of video sequences to a user. This summarization is especially useful if the volume of the video is large and the content is highly redundant.

As technology advances, just about any digital device is capable of capturing video. Examples of these videos include raw footage of a short event (e.g., a child's first words, etc.), a series of re-takes to capture a single event to be edited in production, or a single long relatively static recording (e.g., surveillance video, etc.). To assist users in selecting and extracting interesting and/or relevant parts of these videos, summarization systems and methods are used. Summaries are shorter than the original video source and usually aim to capture only small parts of the content as important events or scenes, such as the utterance of a phrase, a person, an action, or a setting. To compose a summary, several events or scenes are arranged in a way that is easy for the user to understand. In this way, the original meaning and even context of the events is not lost.

Conventional applications make use of video summarization for generating home videos, assisting film editors in finding the best scene "take" from a series of shoots, and assisting video analysis in an intelligence community. One particular type of videos, "rushes," are generally used to produce professional programming, such as television dramas. Rushes are raw, unedited video. Rushes are unique because they generally contain many repeated recordings of a single event that has been altered in some way (e.g., a person's dialog has changed, their position in the scene is slightly different, etc.).

Since rushes are captured for subsequent editing, they generally contain large numbers of repeated scenes and ideas. For example, actors in a television drama may be asked to repeat a particular scene or action multiple times so that video editors and directors have multiple "takes" to choose from. Additionally, this video also contains non-essential (e.g., "junk") content such as color bars to signal the starting of a new recording session and calibrate equipment or physical clappers used to guarantee synchronization between the audio and video streams and provide metadata (e.g., date, series name, scene or take information, etc.) about the next recorded scene. The creation of a rush video summary involves many as yet unrealized goals: reduce junk content, identify and reduce the count of repeated ideas, prioritize and choose only the most interesting ideas, and present the summarized set of ideas in a comprehensible and logical manner.

Accordingly, improved systems and methods for video summarization are required.

BRIEF SUMMARY OF THE INVENTION

The present invention generally provides methods for video summarization. In one embodiment, a method of video summarization includes determining if a video contains one or more junk frames, modifying one or more boundaries of shots of the video based at least in part on the determination of if the video contains one or more junk frames, sampling a plurality of the shots of the video into a plurality of subshots, clustering the plurality of subshots with a multiple step k-means clustering, and creating a video summary based at least in part on the clustered plurality of subshots. The video is segmented into a plurality of shots and a keyframe from each of the plurality of shots is extracted. To cluster the plurality of subshots with a multiple step k-means clustering, the distance among the plurality of subshots as a weighted summation of a motion compensated matching error, a histogram difference in red, green, blue color space, and a histogram difference in hue, saturation, value color space is determined and a distance between a plurality of clusters as a maximum distance between pairs of subshots within the plurality of clusters is determined. If the determined distance between the clusters is smaller than a predetermined threshold, the clusters are merged. If a difference in a keyframe file size in the cluster exceeds a predetermined threshold, a cluster is divided.

In at least one embodiment, the method also includes determining an importance of the subshots in the clustered plurality of subshots and creating a video summary based on the determined importance of the subshots in the clustered plurality of subshots and a time budget. The created video summary is rendered by displaying playback rate information for the rendered video summary, displaying a currently playing subshot marker with the rendered video summary, and displaying an indication of similar content in the rendered video summary.

These and other advantages of the invention will be apparent to those of ordinary skill in the art by reference to the following detailed description and the accompanying drawings.

DETAILED DESCRIPTION

Embodiments of the present invention provide systems and methods for video summarization. Video excerpts (e.g. summaries) are created including objects and events in a source video with minimum redundancy and duration. In a particular embodiment, the duration of the video summary is limited to up to 2% of the duration of the source video. A video into segmented into "shots" and multi-stage clustering is used to eliminate similar shots. Frame importance values that depend on both the temporal content variation and the spatial image salience are used to select the most interesting video clips as part of the video summarization.

In at least one embodiment, a set of segmented subshots are determined, redundancy is reduced and/or eliminated by multi-stage clustering, and the most interesting subshots are determined using both human-emulated salience scores and low-level scene-based changes. Video is first segmented into shots and junk frames are detected based on both audio and visual information. To cope with smooth but significant content changes within a shot, shots are split into subshots.

K-means clustering is then applied to all subshots to detect and consolidate similar subshots. Next, content based importance values computed for all frames and are propagated to subshots and computed clusters. A time budget (e.g., the total duration of the target video summary) is also allocated to the clusters and subshots based on their importance values. As a verification step, image salience is computed for the subshots with high importance values and the most salient segments are selected for summarization using durations determined by the subshot budget. Finally, these video segments are sorted based on their time stamps and they are stitched together as the summarized video.

Figure 1:
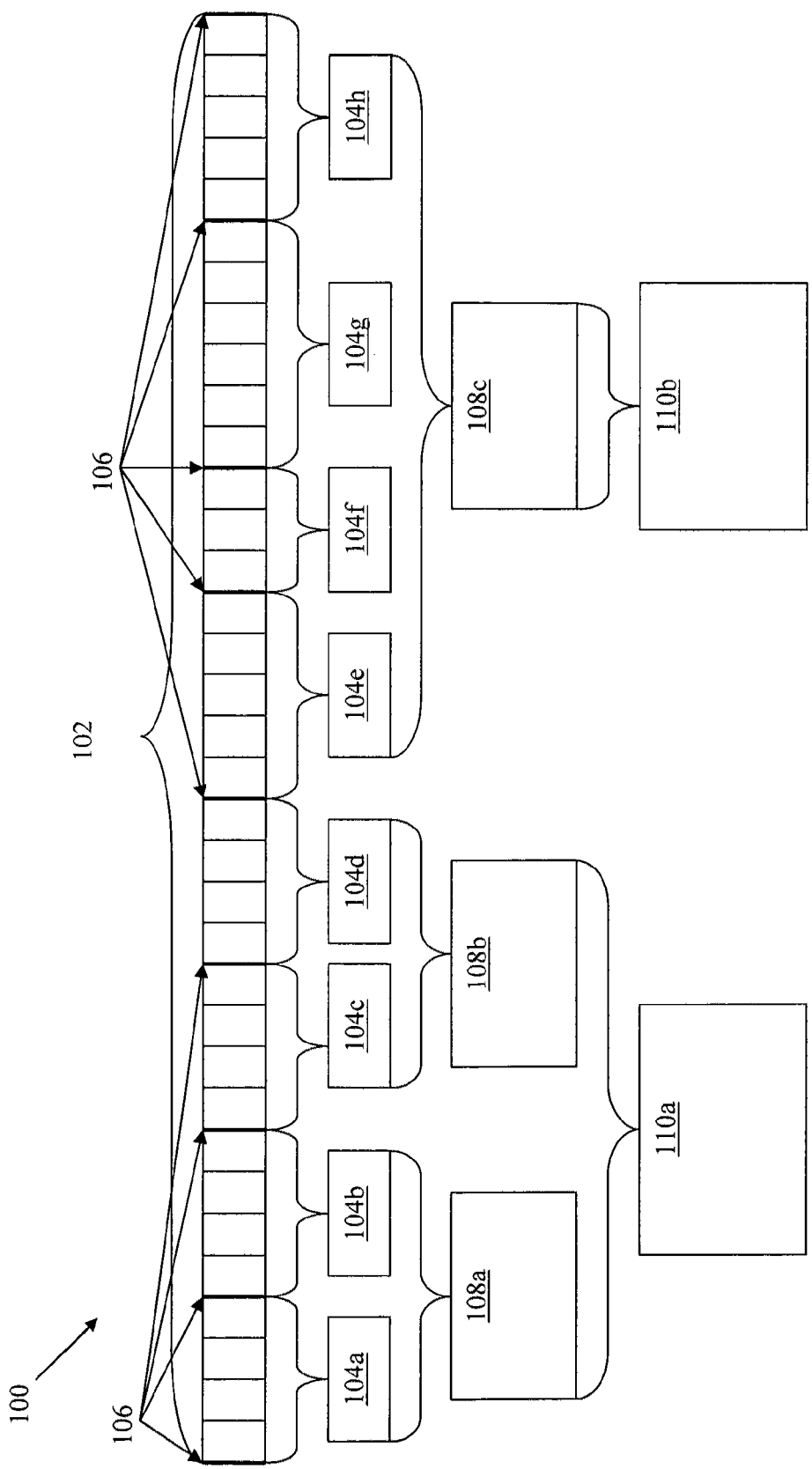
FIG. 1 depicts a hierarchical organization of a video according to an embodiment of the present invention.

FIG. 1 depicts a hierarchical organization of a video 100 according to an embodiment of the present invention. Video 100 is representative of a video that may be summarized according to method 200 and is shown herein to show examples of the various components of a video.

Herein, a "video" or "source video" (e.g., video 100) is a continuous strip of motion picture film, created of a series of frames 102. A "frame" is one of the many single photographic images in a motion picture (e.g., video 100). One or more frames 102 make up a shot, such as shots 104a-h. A "shot" is a portion of the video (e.g., a number of frames 102 of the video 100) with a specific duration, though it is not required that all shots have the same or even similar durations or numbers of frames. Shots 104a-h may each depict a distinct event or version of an event. That is, shots 104a-h may each show a distinct camera action (e.g., zoom, pan, etc.). A "shot boundary" 106 is a beginning or end of a shot. That is, a shot boundary 106 immediately precedes the first frame in a shot and follows the last frame in a shot. It is not necessary that there be a physical or other marking of the "shot boundary"—shot boundaries are defined by the associated first or last frame of the shot. One or more shots 104a-h may be grouped into "takes" 108a-c. Generally, takes 108a-c may be different versions of scenes 110a-b.

For example, two takes 108a and 108b may be made of scene 110a. Each take 108a and 108b has two shots, respective shots 104a-b and 104c-d. Since takes 108a and 108b are different versions of scene 110a, shots 104a and 104c may be similar (e.g., they are versions of the first event in the scene) and shots 104b and 104d may be similar (e.g., they are versions of the second event in the scene). Though described herein and shown in FIG. 1 as specific numbers of frames, shots, takes, and scenes, it may be understood that any appropriate grouping of individual frames 102 may be used as appropriate.

Figure 2:
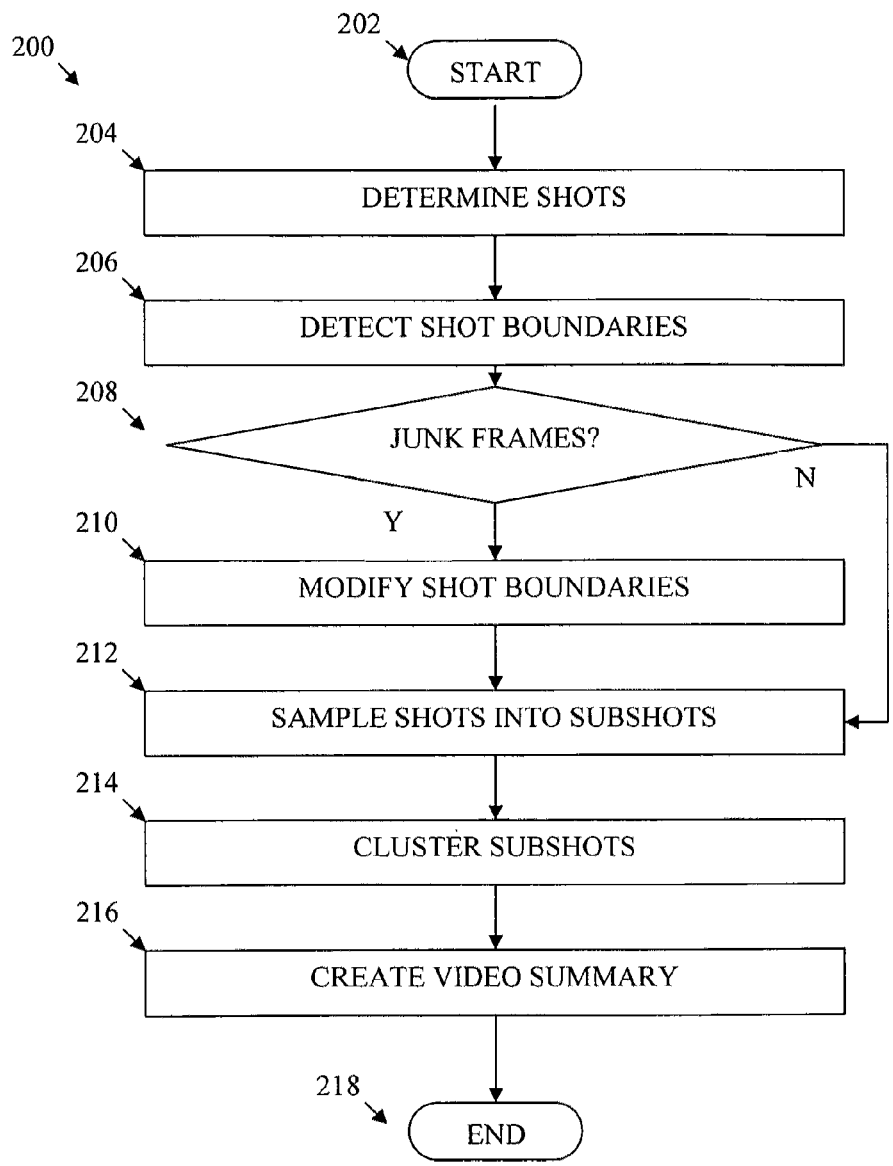
FIG. 2 depicts a flowchart of a method of video summarization according to an embodiment of the present invention.

FIG. 2 depicts a flowchart of a method 200 of video summarization according to an embodiment of the present invention. The method 200 may be performed by any appropriate device. In at least one embodiment, one or more steps of method 200 are performed by a computer adapted specifically to perform such method steps. For example, computer 800, described below with respect to FIG. 8 may be configured as a special-purpose computer for performing one or more steps of method 200. The method starts at step 202.

In step 204, shots are determined. That is, shots (e.g., shots 104a-h) are determined using shot segmentation. Any appropriate method of shot segmentation may be used. The most basic approaches in shot segmentation analyze the change in content like scene changes, object motion, and camera motion between subsequent video frames. More complex shot segmentation approaches maintain a state-based system to monitor and test against criterion for changes such as scene cuts, dissolves, wipes, and zoom in/out effects.

For example, the system described in "A Fast, Comprehensive Shot Boundary Determination System" by Z. Liu, et al., In IEEE International Conference on Multimedia and Expo, Pages 1487-1490, Beijing, China, July 2007, incorporated by reference herein, may be used. Such a system may be used in the detection of shot boundaries in produced news video and documentaries. For less structured video like user generated content or rush video, more content-sensitive approaches like those in "Multimedia Information Retrieval Using Pictoral Transcripts" by B. Shahraray, In Handbook of Multimedia Computing, CRC Press, 1998, incorporated by reference herein, may be used.

A final step of segmentation, for data reduction, is the extraction of keyframes to represent a shot. One or more keyframes may be sampled depending on the duration of a shot and the temporal resolution needed in the system. A subshot is a representation of multiple keyframes extracted for a single shot.

After or as shots 104a-h are determined in step 204, the shot boundaries 106 are detected in step 206. In at least one embodiment, shot boundaries 106 are detected using shot boundary detection methods such as the methods described in "AT&T Research at TRECVID 2007" by Z. Liu, et al., In TRECVID 2007 Workshop, Gaithersburg, Md., November, 2007, and/or "The MIRACLE video search engine" by D. Gibbon, et al., In IEEE CCNC 2006, each incorporated by reference herein.

Figure 3:
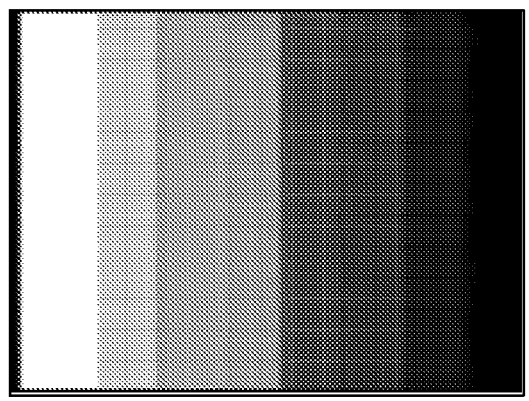
FIG. 3 shows a frame of a TV testing signal.
Figure 4:
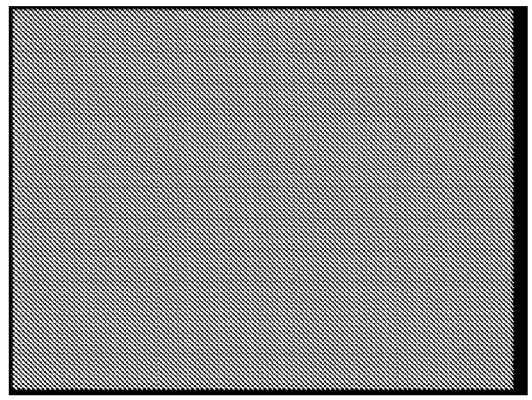
FIG. 4 shows a monochrome frame.
Figure 5:
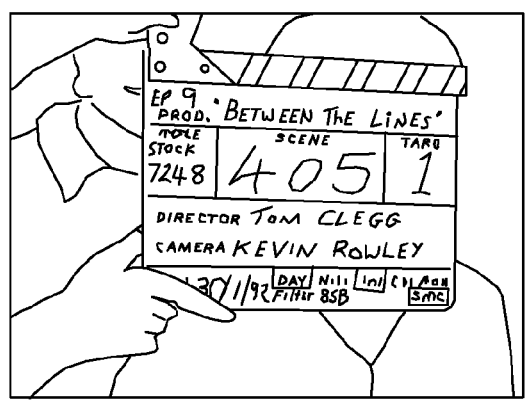
FIG. 5 shows a clapper frame.

In step 208, a determination is made as to whether junk frames exist in the shots 104a-h. Junk frames are frames that do not convey meaningful semantics in the video and should not be included in the video summary. Generally, three main classes of junk frames are found in rush videos. FIGS. 3-5 show these classes of junk frames. FIG. 3 shows a TV testing signal (e.g. color bars), FIG. 4 shows monochrome frames (e.g., white or black frames), and FIG. 5 shows clapper frames.

TV test signals (e.g., color bars) as shown in FIG. 3 are normally accompanied by a pure tone in audio channel, so a multi-modal approach can best detect this junk frame. From the visual stream, some visual features extracted in the shot boundary detection of step 206 are used, like the edge energies and the histogram variance in red, green, blue channels, as well as the intensity. Given the nature of the color bars, the vertical edge energy is significantly greater than the horizontal edge energy, and the histogram variance in all channels are bigger than those in a regular scene are. From the audio stream, acoustic features are extracted like volume, frequency centroid, frequency bandwidth, energy ratio in sub-bands, and voice activity. With a set of threshold-based criterion, the tone signal can be reliably detected. The final detection result of a TV test signal is a fusion of result scores from both modalities.

Monochrome frames, as shown in FIG. 4, can be easily detected by visual features. For example, the dynamic range and the variance of color histogram as well as the intensity histogram may be used. Compared to regular frames, monochrome frames have a narrow dynamic range and smaller variance. Thus, with a simple threshold based classifier, monochrome frames can be effectively detected.

Similar to the TV test signal detection, clapper frames, as shown in FIG. 5, are detected using both audio and visual domains. In audio, clapper frames normally contain a short, spoken phrase (e.g. "action 1, take 1," etc.) with a loud clapper sound. A clapper sound detector relies on a few acoustic features: energy, frequency centroid, energy ratio in sub-bands, and zero crossing rates. In at least one embodiment, a threshold-based classifier is adopted, but a method using support vector machines (SVM) may be used additionally and/or alternatively. In the same or alternative embodiments, a keyword spotting technique to find all salient words, like "take," may be utilized as an alternative detector. From the visual stream, a high level feature (HLF) extraction method detects a clapper scene as a whole frame or with local features utilizing a scale invariant feature transform (SIFT) feature set to detect clapper as an object within a frame.

If junk frames are detected in step 208, the method 200 proceeds to step 210 and the shot boundaries 106 are modified using the junk frame information. If the entire shot is junk frame, the shot is removed. If there are leading or trailing junk frames in the shot, the starting frame or the ending frame of the shot is adjusted. If there are junk frames in the middle of a shot, the shot is broken into multiple shots after the junk frames are removed. The method 200 then proceeds to step 212 and shots 104*a-h* are sampled into subshots. If no junk frames are detected in step 208, the method 200 proceeds to step 212.

Subshots are representations of multiple keyframes extracted for a single shot. To further capture the content changes within a shot 104*a-h*, each shot 104*a-h* is subsampled into subshots. In at least one embodiment, shots 104*a-h* are sampled into subshots based on the shot duration. In an exemplary embodiment, if a shot is more than four seconds and less than six seconds, it is segmented into two equal length subshots; if a shot is more than six seconds, it is segmented into three subshots uniformly. For each subshot, the frame in the middle of the shot is selected as the keyframe for that subshot.

In step 214, subshots are clustered using a multiple step k-means clustering. Clustering is used to remove redundancy among subshots. In at least one embodiment, a very small cluster size is targeted using only grid color moments. With the sub-sampling strategy described above, the average number of highly similar subshot keyframes in a single video is generally around three to four frames, though other numbers of frames are possible. The number of clusters to form is computed based on the total number of subshots known. This solution places a high reliance on the shot boundary detection algorithm to correctly identify temporal discontinuities. K-means clustering selects a centroid point then iteratively updates the cluster labels and cluster centroids until intracluster distance falls below a threshold. To avoid local minima in cluster configurations, several rounds with randomly initialized centroids are evaluated.

In conventional clustering methods, even with careful tuning, the clustering process can make errors both of over-segmentation (e.g., where many clusters split into small groups) and assignment (e.g., where different groups of subshots are incorrectly merged). Embodiments of the present invention utilize a two-step (merging and splitting) post-processing method to improve clustering performance. The distance among all subshots is computed as a weighted summation of three components: 1) motion compensated matching error, 2) histogram difference in red, green, blue (RGB) color space, and 3) histogram difference in hue, saturation, value (HSV) color space. The distance of two clusters is computed as the maximum distance of all pairs of subshots, one from each cluster. If the distance between the nearest two clusters is smaller than a preset threshold, the two clusters are merged. The merging process continues until the minimum cluster distance is larger than the preset threshold. As a final verification of the clusters, the sizes of the files in each cluster are analyzed; keyframe file size after JPEG compression (using the same quality control parameters) is highly related to its embedded content. Clusters are divided only if a significant difference in keyframe file size is detected.

In step 216, a video summary is created based at least in part on the clustered subshots. Generation of such a video summary is discussed in further detail below with respect to method 600 and FIG. 6. The method ends at step 218.

Figure 6:
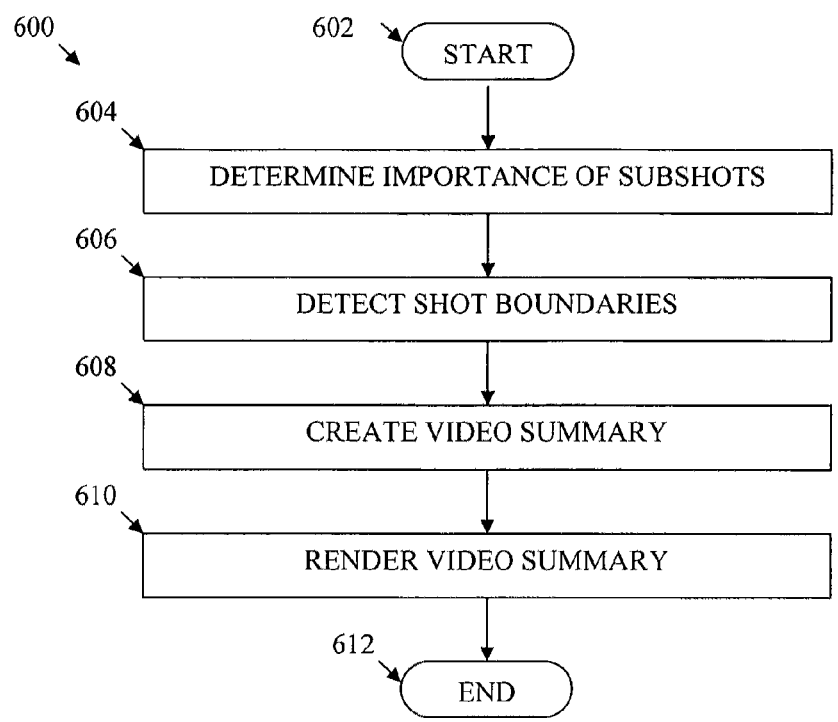
FIG. 6 depicts a flowchart of a method of video summarization according to an embodiment of the present invention.

FIG. 6 depicts a flowchart of a method 600 of video summarization according to an embodiment of the present invention. The method 600 may be performed by any appropriate device. In at least one embodiment, one or more steps of method 600 are performed by a computer adapted specifically to perform such method steps. For example, computer 800, described below with respect to FIG. 8 may be configured as a special-purpose computer for performing one or more steps of method 600. The method starts at step 602.

In step 604, the importance of a subshot is determined. With an upper bound on the length of a video summary, the most important or semantically meaningful frames are selected for the final summarization. Two scores measure the importance of a frame—an average salience value of the frame's content and the visual difference of the frame compared to a previous frame. The salience of an image is used to identify and score regions of an image that a human would find interesting. Pixel-based score maps are created from a multi-resolution analysis of three different approaches: color channel differences, an intensity level difference, and an edge orientation difference. Additionally, a multi-scalar approach is used so all keyframes are pre-scaled to a thumbnail size (e.g., Sub Quarter Common Intermediate Format (SQCIF) or 128×96 pixels) before processing.

Similar to the subshot clustering described above with respect to step 214 of method 200, visual difference is measured by three components: motion estimations, RGB color histograms, and LUV histograms. These values are computed during shot boundary detection in step 206 of method 200, so no additional computation is required for importance determination. To balance the contribution of both scores, an average of normalized salience scores and visual difference values determine the importance value.

In step 606, a video summary is created. In at least one embodiment, the maximum duration of a video summary is set at 2% or less of the original video. For example, for a half hour video, only 36 seconds of content can be compiled in the summary. To improve the visual experience, each segment within the summary should be at least 1 second long. Otherwise, the summary of different scenes will jump too quickly and a human evaluator would not have enough time to understand and judge each chunk of the summary.

Assume the total budget is B seconds and there are N clusters $C_i$, $1 \leq i \leq N$. Each cluster $C_i$ contains $L_i$ subshots $S_i^j$, $1 \leq j \leq L_i$, and each subshot S $S_i^j$ starts from frame $B_i^j$, and ends at frame $E_i^j$. The importance value for frame k is denoted as $Im_f(k)$, the importance value for subshot m is denoted as $Im_s(m)$, and the value for cluster i is denoted as $Im_c(i)$. The subshot importance value is the summation of the frame importance values of all the frames within corresponding subshot, and the cluster importance value is the summation of the subshot importance values of all member subshots.

The video summary may be created by allocating budgets for all clusters, allocating budges for subshots within each cluster, and picking the video segment from each subshot. First, all clusters are sorted based on their importance values. If the budget B is bigger than the number of clusters N, each cluster is assigned with round(B/N) time units (e.g., seconds) at the beginning. The rest of the budget is assigned in the importance order. A predetermined time unit (e.g., one second) is assigned to the cluster with the maximum importance value and a predetermined time unit (e.g., one second) is assigned to the next important cluster until all budgets are used up. In a similar way, the budget of each cluster is assigned to all member subshots.

Cluster $C_i$ has a budget of $b_i$. If it is bigger than the number of all subshots in this cluster, $L_i$, then each subshot $S_i^j$ is allocated with round($b_i/L_i$) time units (e.g., seconds). The remaining budget is assigned based on the subshot importance order—one time unit (e.g., second) to the most important subshot and one time unit to the next important subshot until no budget is left.

Of course, other heuristic rules may be used to choose the video segment within a subshot. For example, to eliminate the effect of clapper frames, the beginning three seconds of the subshot is ignored if it is longer than six seconds. If the subshot is shorter than the assigned budgets, then the ending frame is extended to meet the budget. Normally, the assigned budget is much shorter than the subshot duration. In this case, the continuous segment whose overall importance value is the maximum within the subshot is chosen. The selected video segments are sorted in temporal order, and the result is a list of all selected video segments and some side information for rending the summary video.

Figure 7:
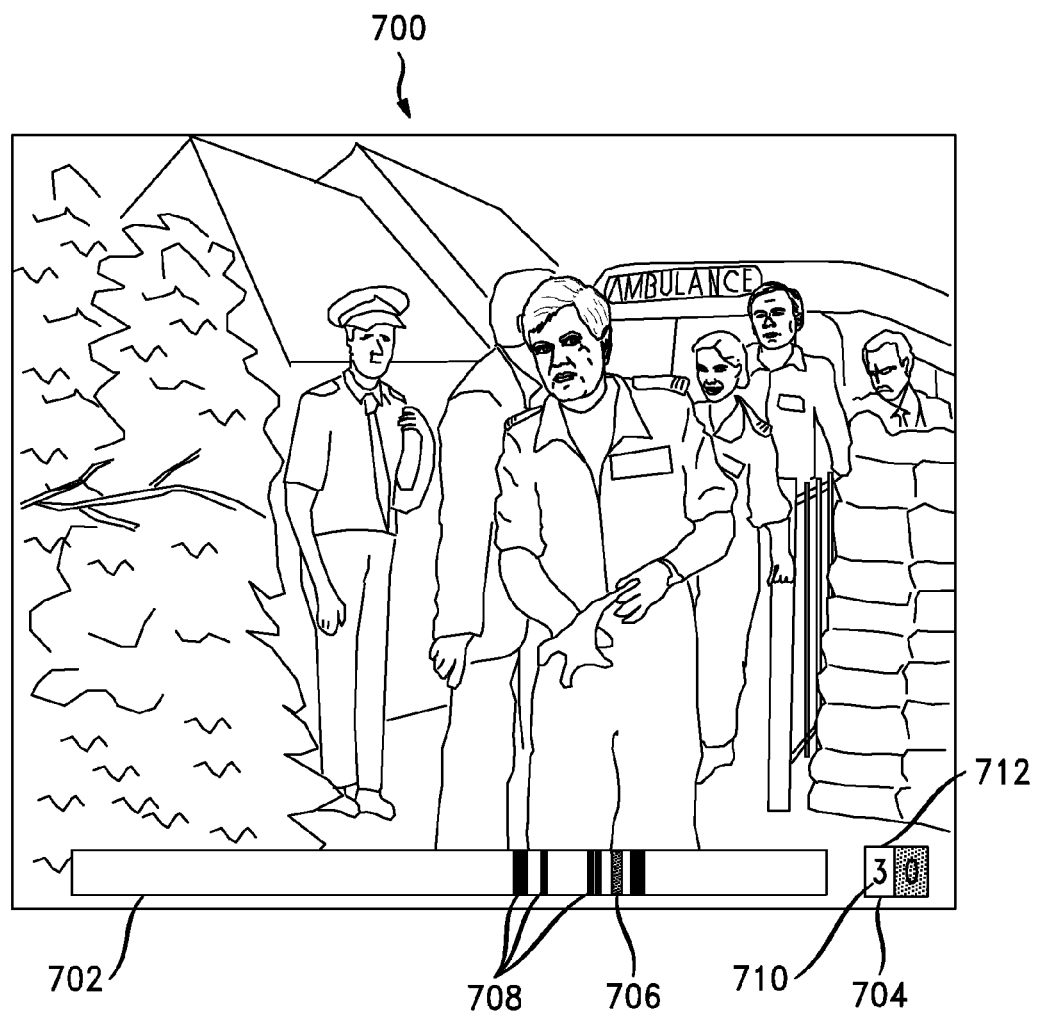
FIG. 7 depicts a rendered video summary according to an embodiment of the present invention.

In step 610, the video summary is rendered. Summarization rendering is the arrangement of the most important subshot sequences into a logical and easily understandable summary video. In at least one embodiment, two choices for summary rendering are the type of frame rendering (e.g., a simple full-frame view versus multiple sub-picture renderings) and the playback speed (e.g., normal versus variable or dynamic). An exemplary rendered video summary is depicted in FIG. 7. The method ends at step 612.

FIG. 7 depicts a rendered video summary 700 according to an embodiment of the present invention. The rendered video summary 700 is simple in that it has no text to read, but also informative with indications of position with position and frequency bar 702 and time remaining on the current subshot with timer 704 indicating speed and fraction of clip remaining.

Frequency bar 702 has a currently playing marker 706 and similar content markers 708. Currently playing marker 706 indicates the portion of the video 100 depicted in video summary 700 that is currently playing. Similar content markers 708 indicate keyframes in the video summary 700 that are similar to each other as discussed above.

Timer 704 indicates the playback rate 710 by displaying a rate value. In the exemplary embodiment shown in FIG. 7, the playback rate is "3.0." That is, the video summary is currently being played at triple speed. Timer 704 also indicates that duration of the currently displayed subshot with the visual cue of a differently colored box 712 in the timer 704. That is, the currently displayed subshot has a defined duration, which is expressed as the width of the time 704. As the subshot is played back, the differently colored box 712 (e.g., the white portion of timer 704) is expanded to indicate the elapsed time. Of course, other visual cues may be used to indicate the currently displayed subshot, the duration of any scenes or other portions of video 100, the number of frames played/yet to play, etc.

Figure 8:
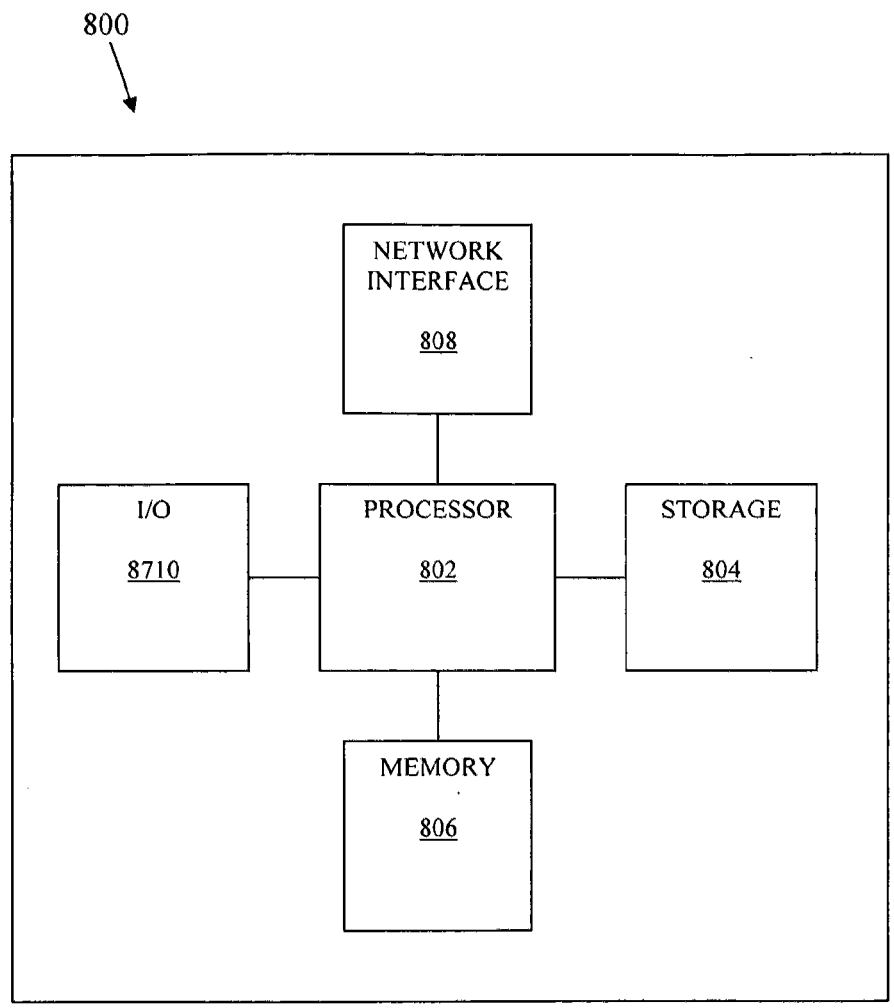
FIG. 8 is a schematic drawing of a computer.

FIG. 8 is a schematic drawing of a computer 800 according to an embodiment of the present invention.

Computer 800 contains devices that form a controller including a processor 802 that controls the overall operation of the computer 800 by executing computer program instructions, which define such operation. The computer program instructions may be stored in a storage device 804 (e.g., magnetic disk, database, etc.) and loaded into memory 806 when execution of the computer program instructions is desired. Thus, applications for performing the herein-described method steps, such as those described below with respect to methods 200 and 600 are defined by the computer program instructions stored in the memory 806 and/or storage 804 and controlled by the processor 802 executing the computer program instructions. The computer 800 may also include one or more network interfaces 808 for communicating with other devices via a network. The computer 800 also includes input/output devices 810 that enable operator interaction with the computer 800. Computer 800 and/or processor 802 may include one or more central processing units, read only memory (ROM) devices and/or random access memory (RAM) devices. One skilled in the art will recognize that an implementation of an actual computer could contain other components as well, and that the computer of FIG. 8 is a high-level representation of some of the components of such a computer for illustrative purposes.

According to some embodiments of the present invention, instructions of a program (e.g., controller software) may be read into memory 806, such as from a ROM device to a RAM device or from a LAN adapter to a RAM device. Execution of sequences of the instructions in the program may cause the computer 800 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 806 may store the software for the computer 800, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of video summarization comprising:
   determining if a video contains a junk frame;
   modifying a boundary of shots of the video based on the determining if a video contains a junk frame;
   sampling a plurality of the shots of the video into a plurality of subshots;

clustering the plurality of subshots with a multiple step k-means clustering, comprising:
  clustering the plurality of subshots;
  determining a distance among the plurality of subshots as a weighted summation of a motion compensated matching error, a histogram difference in red, green, blue color space, and a histogram difference in hue, saturation, value color space;
  determining a distance between a plurality of clusters as a maximum distance between pairs of subshots within the plurality of clusters;
  merging the plurality of clusters if a determined distance between the plurality of clusters is smaller than a predetermined threshold; and
  dividing a cluster in the plurality of clusters if a difference in a keyframe file size in the cluster exceeds a predetermined threshold; and
creating a video summary based on the clustering the plurality of subshots.

2. The method of claim 1 further comprising:
segmenting the video into a plurality of shots; and
extracting a keyframe from each of the plurality of shots.

3. The method of claim 1 wherein determining if a video contains a junk frame comprises:
extracting visual features from the video;
comparing the visual features to a predetermined threshold.

4. The method of claim 3 further comprising:
extracting acoustic features from an audio stream associated with the video; and
comparing the acoustic features to a predetermined threshold.

5. The method of claim 4 wherein the visual features are selected from a group comprising edge energies, color channel histogram variance, and color intensity and the acoustic features are selected from a group comprising volume, frequency centroid, frequency bandwidth, energy ratio in subbands, and voice activity.

6. The method of claim 1 wherein determining if a video contains a junk frame comprises:
  detecting a clapper scene with a feature extractor;
  extracting acoustic features from an audio stream associated with the video, wherein the acoustic features are selected from a group comprising volume, frequency centroid, frequency bandwidth, energy ratio in subbands, and zero crossing rate; and
  comparing the acoustic features to a predetermined threshold.

7. The method of claim 1 wherein determining if a video contains a junk frame comprises:
  detecting a clapper object in a frame of the video with a scale invariant feature transform feature set;
  extracting acoustic features from an audio stream associated with the video, wherein the acoustic features are selected from a group comprising volume, frequency centroid, frequency bandwidth, energy ratio in subbands, and zero crossing rate; and
  comparing the acoustic features to a predetermined threshold.

8. The method of claim 1 wherein creating a video summary based on the clustering the plurality of subshots comprises:
  determining an importance of subshots in the plurality of subshots; and
  creating a video summary based on the determining an importance of subshots in the plurality of subshots and a time budget.

9. A method of video summarization comprising:
determining if a video contains a junk frame;
modifying a boundary of shots of the video based on the determining if a video contains a junk frame;
sampling a plurality of the shots of the video into a plurality of subshots;
clustering the plurality of subshots with a multiple step k-means clustering;
creating a video summary based on the clustering the plurality of subshots;
rendering the video summary;
displaying playback rate information for a rendered video summary;
displaying a currently playing subshot marker with the rendered video summary; and
displaying an indication of similar content in the rendered video summary.

10. A non-transitory computer readable medium storing computer program instructions for video summarization, which, when executed on a processor, cause the processor to perform a method comprising:
determining if a video contains a junk frame;
modifying a boundary of shots of the video based on the determining if a video contains a junk frame;
sampling a plurality of the shots of the video into a plurality of subshots;
clustering the plurality of subshots with a multiple step k-means clustering, comprising:
  clustering the plurality of subshots;
  determining a distance among the plurality of subshots as a weighted summation of a motion compensated matching error, a histogram difference in red, green, blue color space, and a histogram difference in hue, saturation, value color space;
  determining a distance between a plurality of clusters as a maximum distance between pairs of subshots within the plurality of clusters;
  merging a plurality of clusters if a determined distance between the clusters is smaller than a predetermined threshold; and
  dividing a cluster in the plurality of clusters if a difference in a keyframe file size in the cluster exceeds a predetermined threshold; and
creating a video summary based on the clustering the plurality of subshots.

11. The computer readable medium of claim 10 the method further comprising:
segmenting the video into a plurality of shots; and
extracting a keyframe from each of the plurality of shots.

12. The computer readable medium of claim 10 wherein the determining if a video contains a junk frame further comprises:
extracting visual features from the video;
comparing the visual features to a predetermined threshold.

13. The computer readable medium of claim 12, the method further comprising:
extracting acoustic features from an audio stream associated with the video; and
comparing the acoustic features to a predetermined threshold.

14. The computer readable medium of claim 13 wherein the visual features are selected from a group comprising edge energies, color channel histogram variance, and color intensity and the acoustic features are selected from a group comprising volume, frequency centroid, frequency bandwidth, energy ratio in sub-bands, and voice activity.

15. The computer readable medium of claim 10 wherein the determining if a video contains a junk frame further comprises:
   detecting a clapper scene with a feature extractor;
   extracting acoustic features from an audio stream associated with the video, wherein the acoustic features are selected from a group comprising volume, frequency centroid, frequency bandwidth, energy ratio in sub-bands, and zero crossing rate; and
   comparing the acoustic features to a predetermined threshold.

16. The computer readable medium of claim 10 wherein the determining if a video contains a junk frame further comprises:
   detecting a clapper object in a frame of the video with a scale invariant feature transform feature set;
   extracting acoustic features from an audio stream associated with the video, wherein the acoustic features are selected from a group comprising volume, frequency centroid, frequency bandwidth, energy ratio in sub-bands, and zero crossing rate; and
   comparing the acoustic features to a predetermined threshold.

17. The computer readable medium of claim 10 wherein the creating a video summary based on the clustering the plurality of subshots further comprises:
   determining an importance of subshots in the plurality of subshots; and
   creating a video summary based on the determining an importance of subshots in the plurality of subshots and a time budget.

18. The computer readable medium of claim 10, the method further comprising:
   rendering the video summary;
   displaying playback rate information for a rendered video summary;
   displaying a currently playing subshot marker with the rendered video summary; and
   displaying an indication of similar content in the rendered video summary.

* * * * *